A. R. MISKIN.
SPRING WHEEL.
APPLICATION FILED APR. 16, 1908.

950,942.

Patented Mar. 1, 1910.
2 SHEETS—SHEET 1.

WITNESSES:

INVENTOR.
Arthur R. Miskin
BY
ATTORNEY.

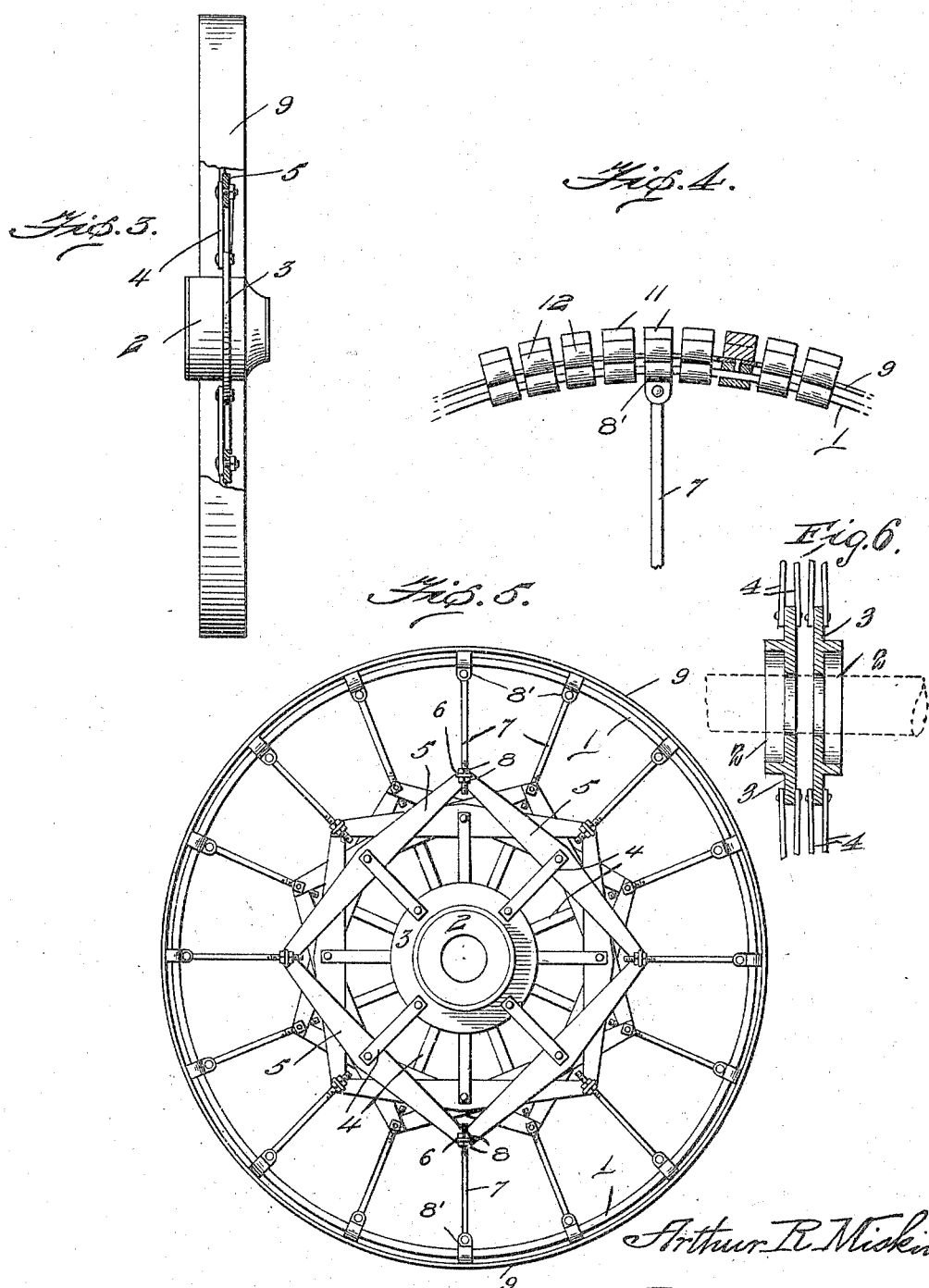

UNITED STATES PATENT OFFICE.

ARTHUR R. MISKIN, OF IDAHO FALLS, IDAHO, ASSIGNOR TO MISKIN SPRING WHEEL COMPANY, OF IDAHO FALLS, IDAHO, A CORPORATION OF IDAHO.

SPRING-WHEEL.

950,942.

Specification of Letters Patent.   Patented Mar. 1, 1910.

Application filed April 16, 1908.   Serial No. 427,359.

*To all whom it may concern:*

Be it known that I, ARTHUR R. MISKIN, a citizen of the United States, residing at Idaho Falls, in the county of Bingham and State of Idaho, have invented certain new and useful Improvements in Spring-Wheels, of which the following is a specification.

My invention has for its object the provision of a spring wheel wherein the hoop or rim of the wheel itself is resilient or pliable so as to act in the capacity of a spring. In this way, the jars and jolts are taken up by the spring rim of the wheel and no other springs are necessary.

Thus a further object is to provide a spring wheel consisting of but very few and simple parts.

Another object of my invention is the provision of a spring wheel which will absorb all jar or shock without communicating it to the hub or axle of the vehicle, which will adapt itself automatically to varying loads and stress and which will adapt itself to all irregularities in the roadway.

A further object of the invention is to provide a spring wheel capable of exerting great tractive power and which is provided with compensating means for distributing the strain equally to the entire circumference of the spring rim.

The details of construction, arrangement, and operation of parts are as hereinafter described, and shown in the accompanying drawings, in which—

Figure 1:
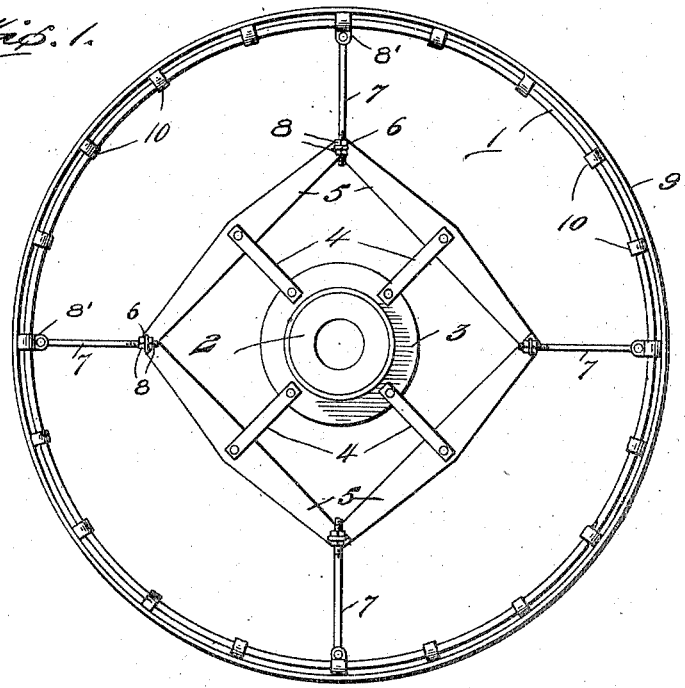
Figure 2:
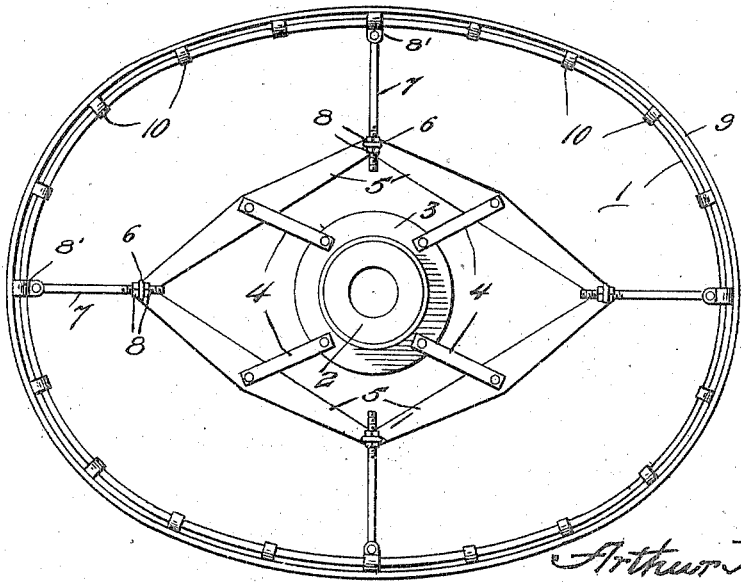

Figure 1 is a face view of the wheel in its simplest and normal form. Fig. 2 is a face view of the same wheel showing the movable parts in the position they assume when the wheel is sustaining a load. Fig. 3 is in part an edge view and in part a cross-section of the wheel shown in Figs. 1 and 2. Fig. 4 is mainly a side view, a portion being in section, illustrating the attachment of cushioned blocks on the rim of the wheel. Fig. 5 is a face view of the modified form of the wheel, that is to say, a wheel having a multiplicity of flexible frames connecting the spokes with the hub. Fig. 6 is a detail section of the hub portion of the wheel shown in Fig. 5.

I will first describe the invention as shown in Figs. 1, 2, 3. The numeral 1 designates the rim of the wheel which is in the form of a spring metal hoop, combining elasticity and rigidity in due proportion. It is provided with a central boxing or hub 2, having a radial flange 3. Around this hub is arranged a frame composed of a series of bars 5, which are pivoted together at their ends preferably by means of eye-bolts 6; and connected with the hub flange 3 by means of pivoted links 4 which are each pivoted to a bar 5 at a point outside a straight line connecting the pivotal connections of the ends of the bar. The joints of this frame are connected with the frame 1 by means of spokes 7 pivoted to clips 8' that embrace the rim. In its normal form the frame composed of bars 5 is a rectangular parallelogram as shown in Fig. 1, the rim 1 being in such case circular. When a load is imposed on the wheel it is flattened more or less, or assumes a more or less elliptical form, as shown in Fig. 2, in which case, the parallelogram becomes oblique, or diamond-shape. It is obvious that this result must ensue by the reason of thrust and tension applied by the links 4 and spokes 7.

The clips 8' embrace or pass around the flexible rim 1, and, in order to hold them properly spaced upon the rim, a thin steel ribbon is applied to the rim and extends around it, the clips being riveted or otherwise secured to this outer hoop 9 or cushion blocks 11 of rubber may be employed, the same being spaced apart, as shown in Fig. 4.

The spokes 7 are adjustably connected with the joints of the parallelogram frame by means of nuts 8 applied to their inner screw-threaded ends. Clips 10 are arranged between the clips 8' as shown, for the purpose of holding the outer steel rim 9 duly spaced from the inner rim 1.

It is obvious that when the rim of the wheel comes in contact with an obstruction in the roadway, it will flatten more or less, in the same manner as under the imposition of a load, and will thus pass easily over the obstruction, without causing a severe jarring or jolt. For a further cushioning effect, blocks of rubber, leather, or other yielding material, may be secured to the outer rim, as shown in Fig. 4, and, for this purpose the spacing blocks 10 may be utilized.

When it is desired to provide a wheel of this character, that shall be capable of sustaining heavy loads, the number of spokes 7 and rim clips 8', also the number of the parallelogram frames, is increased, as shown in Fig. 5. It becomes necessary in such case to provide the hub 2 with two parallel flanges 3, instead of one as in the form of wheel shown in Figs. 1, 2, 3. The arrangement of the flanges and the attachment of the links 4, are illustrated in Fig. 6.

What I claim is:

1. The improved spring wheel composed of a flexible rim a hub having a radial flange, a flexible frame arranged around the hub and having normally the form of a parallelogram, and consisting of a series of bars pivoted together at their ends, a series of links corresponding in number with said bars and pivotally connecting the latter with the hub, and a series of radial spokes which pivotally connect the joints of the bars with the rim, as shown and described.

2. The improved spring wheel composed of a hub having two radial flanges spaced apart, a flexible rim, a series of frames arranged around the hub and composed of bars pivoted together at their ends and having normally the form of a parallelogram, a series of links pivotally connecting the flanges with the bars composing the several frames, and a series of spokes corresponding in number to the joints of the several frames, and extending radially between said joints and the rim to which they are pivoted, substantially as described.

In testimony whereof I affix my signature, in presence of two witnesses.

ARTHUR R. MISKIN.

Witnesses:
EDWIN E. MISKIN,
JOHN E. GROBERG.